United States Patent
Torre

(10) Patent No.: US 9,522,725 B2
(45) Date of Patent: Dec. 20, 2016

(54) STOWABLE AND DEPLOYABLE UNMANNED AERIAL VEHICLE

(71) Applicant: Northrop Grumman Systems Corporation, Falls Church, VA (US)

(72) Inventor: Christopher N. Torre, Carpinteria, CA (US)

(73) Assignee: Northrup Grumman Systems Corporation, Falls Church, VA (US)

( * ) Notice: Subject to any disclaimer, the term of this patent is extended or adjusted under 35 U.S.C. 154(b) by 352 days.

(21) Appl. No.: 14/179,697

(22) Filed: Feb. 13, 2014

(65) Prior Publication Data

US 2015/0225072 A1    Aug. 13, 2015

(51) Int. Cl.
  *B64C 3/56* (2006.01)
  *B64C 39/02* (2006.01)
  *B64C 1/30* (2006.01)

(52) U.S. Cl.
  CPC . *B64C 3/56* (2013.01); *B64C 1/30* (2013.01); *B64C 39/02* (2013.01); *B64C 39/024* (2013.01); *B64C 2201/102* (2013.01); *B64C 2201/201* (2013.01)

(58) Field of Classification Search
  CPC .............. B64C 1/30; B64C 3/56; B64C 5/12; B64C 2201/102; B64C 2201/20; B64C 2201/201
  See application file for complete search history.

(56) References Cited

U.S. PATENT DOCUMENTS

| | | | | |
|---|---|---|---|---|
| 2,423,095 A | * | 7/1947 | Gibson | B64C 3/54 244/218 |
| 2,743,072 A | * | 4/1956 | Emmi | B64C 3/54 242/157 R |
| 3,249,160 A | * | 5/1966 | Messerschmitt | B64C 27/46 416/174 |
| 3,606,571 A | * | 9/1971 | Wood | B64C 29/00 244/7 A |
| 3,666,210 A | * | 5/1972 | Look | B64C 3/56 244/218 |

(Continued)

FOREIGN PATENT DOCUMENTS

| EP | 1541465 | 6/2005 |
|---|---|---|
| GB | 556477 | 10/1943 |

OTHER PUBLICATIONS

Ward, Logan; Length-Morphing Rotor Ready to Provide Helicopter Versatility; Sep. 30, 2007; Popular Mechanics; <http://www.popularmechanics.com/flight/a2150/4224761>.*

(Continued)

*Primary Examiner* — Tien Dinh
*Assistant Examiner* — Michael A Fabula
(74) *Attorney, Agent, or Firm* — Patti & Malvone Law Group, LLC

(57) ABSTRACT

An unmanned aerial vehicle (UAV) can be deployed from a small stowed package for flight and stowed back into the package after the flight is complete is disclosed. The UAV is retracted to a volume that is less than half of it's fully deployed volume. This allows the UAV to be transported to any desired field position on a truck or other convenient transportation. The UAV may also be launched from a ship deck. In a further aspect, the flexible deployment of the UAV will allow a single UAV to be used in place of multiple types of UAVs.

22 Claims, 10 Drawing Sheets

(56) References Cited

U.S. PATENT DOCUMENTS

| | | | | |
|---|---|---|---|---|
| 4,410,151 A * | 10/1983 | Hoppner | B64C 39/024 | 244/120 |
| 4,530,476 A * | 7/1985 | Thurber, Jr. | B64C 39/024 | 244/120 |
| 4,824,053 A * | 4/1989 | Sarh | B64C 3/54 | 244/218 |
| 4,842,218 A | 6/1989 | Groutage et al. | | |
| 5,118,052 A * | 6/1992 | Alvarez | B64C 1/30 | 244/120 |
| 5,192,037 A * | 3/1993 | Moorefield | F42B 10/20 | 244/3.28 |
| 5,201,478 A * | 4/1993 | Wooley | B64C 1/00 | 244/120 |
| 5,203,520 A * | 4/1993 | Przygodzki | B64C 37/00 | 244/17.19 |
| 6,082,665 A * | 7/2000 | Spitzer | B60F 5/02 | 244/2 |
| 6,164,590 A * | 12/2000 | Kusic | B64C 27/08 | 244/120 |
| 6,834,835 B1 * | 12/2004 | Knowles | B64C 3/54 | 244/198 |
| 7,762,500 B1 * | 7/2010 | Dhall | B60F 5/02 | 244/123.1 |
| 7,789,343 B2 * | 9/2010 | Sarh | B64C 3/54 | 244/45 A |
| 7,832,690 B1 * | 11/2010 | Levine | B64C 3/54 | 244/123.11 |
| 8,371,520 B2 * | 2/2013 | Easter | B60F 5/02 | 244/199.4 |
| 8,439,314 B1 * | 5/2013 | Dhall | B60F 5/02 | 244/2 |
| 8,784,057 B2 * | 7/2014 | Podgurski | B64C 27/00 | 416/1 |
| 9,010,693 B1 * | 4/2015 | Barbieri | B64C 39/024 | 244/123.14 |
| 9,139,284 B1 * | 9/2015 | Dhall | B64C 3/185 | |
| 9,371,130 B1 * | 6/2016 | Barbieri | B64C 3/54 | |
| 2002/0066825 A1 * | 6/2002 | Miralles | B64C 1/30 | 244/49 |
| 2003/0223868 A1 * | 12/2003 | Dawson | F03D 7/0236 | 416/1 |
| 2005/0151014 A1 * | 7/2005 | McGeer | B64C 25/68 | 244/120 |
| 2005/0274845 A1 * | 12/2005 | Miller | B64C 39/024 | 244/49 |
| 2009/0166477 A1 * | 7/2009 | Bousfield | B64C 3/18 | 244/218 |
| 2009/0290981 A1 * | 11/2009 | Gandhi | B64C 27/46 | 416/1 |
| 2010/0230547 A1 * | 9/2010 | Tayman | B64C 27/24 | 244/7 C |
| 2010/0282917 A1 * | 11/2010 | O'Shea | B64C 39/024 | 244/218 |
| 2011/0001016 A1 | 1/2011 | Skillen et al. | | |
| 2011/0036939 A1 * | 2/2011 | Easter | B60F 5/02 | 244/2 |
| 2011/0180657 A1 * | 7/2011 | Gionta | B64C 3/56 | 244/49 |
| 2011/0206513 A1 * | 8/2011 | Walker | B64C 27/32 | 416/88 |
| 2011/0315806 A1 * | 12/2011 | Piasecki | G05D 1/102 | 244/2 |
| 2012/0138727 A1 * | 6/2012 | Fisher | B64C 39/024 | 244/3.15 |
| 2012/0219417 A1 * | 8/2012 | Podgurski | B64C 27/00 | 416/1 |
| 2012/0280080 A1 * | 11/2012 | Lubenow | B64C 39/024 | 244/49 |
| 2013/0146716 A1 * | 6/2013 | Gettinger | B64C 39/024 | 244/215 |
| 2015/0136898 A1 * | 5/2015 | McCoy | B64C 37/00 | 244/49 |

OTHER PUBLICATIONS

Chen, Xi et al; Design of an axially telescoping wing control system based on servo motor; Mechanic Automation and Control Engineering (MACE), 2011 Second International Conference on; pp. 1169-1172, Jul. 15-17, 2011.

Samuel, Julie Blondeau et al; Design and Testing of a Pneumatic Telescopic Wing for Unmanned Aerial Vehicles; Journal of Aircraft, vol. 44, No. 4 (2007), pp. 1088-1099.

Scott, Matthew et al; Development of a Novel Low Stored Volume High-Altitude Wing Design; 50th AIAA/ASME/ASCE/AHS/ASC Structures, Structural Dynamics, and Materials Conference, May 4-7, 2009, Palm Springs, California; pp. 1-12.

Loh, Ben et al; Stowed Unmanned Air Vehicle Engineering (SUAVE): Deployable Wing Design and Testing, 53rd AIAA/ASME/ASCE/AHS/ASC Structures, Structural Dynamics and Materials Conference, Publication Date: Apr. 23, 2012-Apr. 26, 2012; pp. 1-21.

* cited by examiner

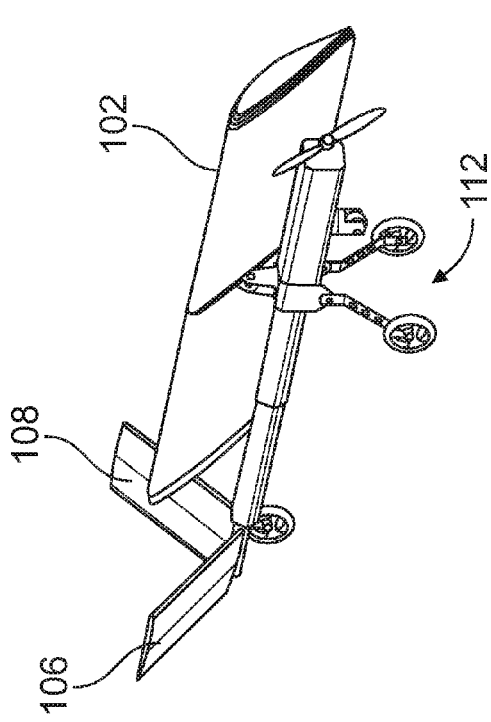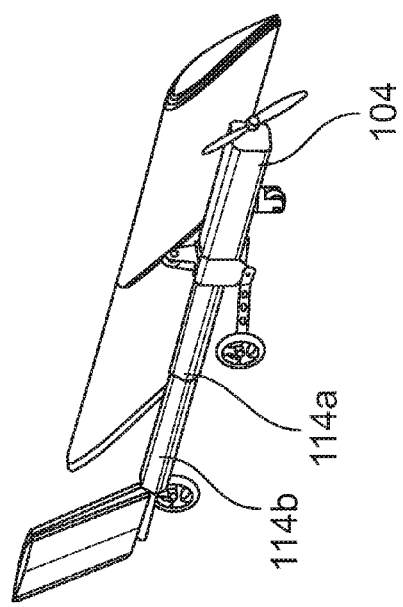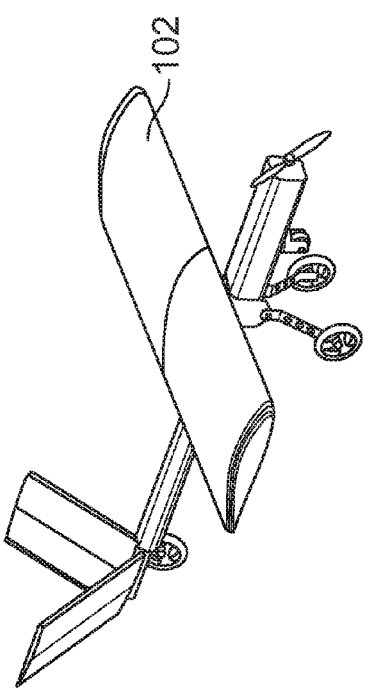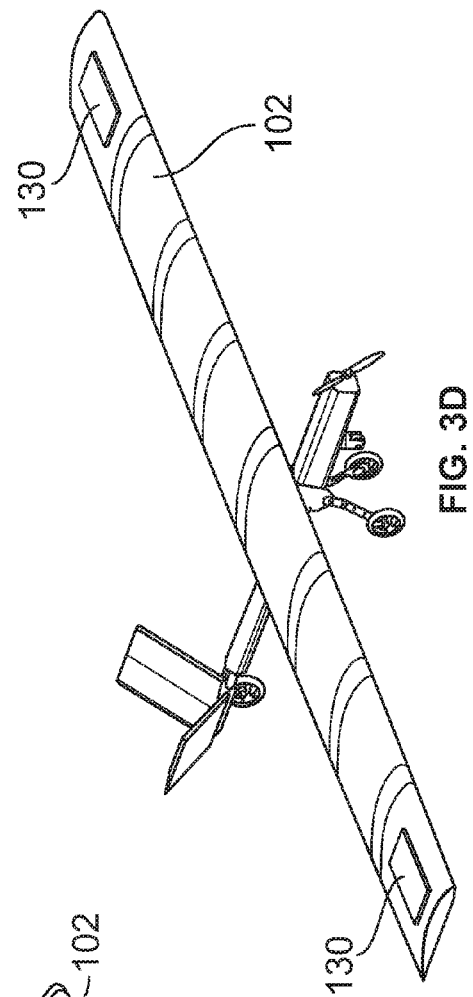

STOWABLE AND DEPLOYABLE UNMANNED AERIAL VEHICLE

FIELD OF THE INVENTION

The invention relates generally to unmanned aerial vehicles (UAVs) and more particularly to improved transportation and deployment of UAVs.

BACKGROUND

Unmanned aerial vehicles are aircraft that are remotely controlled by a human operator or are software-programmed for autonomous flight. They are used for a variety of purposes, from recreational to commercial as well as in military applications. Commercial uses of UAVs included security, property inspection, and real estate photography, among others. Military applications include, for example, surveillance, reconnaissance and target acquisition.

UAV's can have many different geometries for various uses, thus there are a multiplicity of types dependent on the operational scenario. Since the distance a UAV can travel while in flight is limited by factors such as weight and power source, often there is a need to transport a UAV to a particular site so that it can be launched closer to a desired field position. Most UAVs are of a fixed geometric construction that cannot be tightly packaged, thus making transportation difficult.

Thus, a need exists for a UAV that can rapidly move into field position and perform a mission without taking up a large volume during transportation.

SUMMARY

In a first aspect, the invention provides a UAV that can be deployed from a small stowed package for flight and stowed back into the package after the flight is complete. In a further aspect, the invention will allow the UAV to be transported to a required field position on a truck or other means of transportation. The UAV may also be launched from a ship deck. In a further aspect, the flexibility of the UAV will allow a single UAV to be used in place of multiple types of UAVs.

The invention in one embodiment encompasses an apparatus. The apparatus comprises an aerial vehicle, having a fuselage, a telescoping wing assembly comprising two wings, each comprising a telescoping axis and a wing root mechanism comprising a vertical rotation pivot operatively coupling said wing assembly to said fuselage, wherein said wing assembly rotates between a position in which the telescoping axis is parallel to an axis of the fuselage and a position in which the telescoping axis is perpendicular to the axis of the fuselage.

In a further embodiment, the wing root mechanism of the aerial vehicle also includes a horizontal rotation pivot operatively coupling said wing assembly to said vertical rotation pivot wherein said telescoping wing assembly may be tilted.

In another embodiment, the telescoping wing assembly of the aerial vehicle also includes a plurality of concentric tubular mast segments, slideable relative to adjacent mast segments and coaxial with the telescoping axis.

In yet another embodiment, the fuselage of the aerial vehicle also includes a tail portion having a plurality of telescoping concentric tubular mast segments and an empennage assembly rotatably attached to an end of the tail portion.

In a another embodiment, the aerial vehicle is deployed by extending the wing assembly and tail portions, and stowed by retracting the wing assembly and tail portions in a case with less than half the volume of the fully deployed configuration.

In a further embodiment, the aerial vehicle can have a range of wingspans and fuselage lengths, and also includes imaging and sensor devices.

DESCRIPTION OF THE DRAWINGS

Features of example implementations of the invention will become apparent from the description, the claims, and the accompanying drawings in which:

FIGS. 3A-3D illustrate a method of deploying the UAV of FIG. 1B.

DETAILED DESCRIPTION

The unmanned aerial vehicle (UAV) of the present invention uses a telescoping tubular mast system for the wing and tail that allows the UAV to be stowed in a package occupying a volume that is less than half of its fully assembled volume. The telescoping mast uses short, interlocking tube segments that can be deployed for flight or retracted when the UAV is stowed. This flexibility allows the wing span and fuselage length to be varied depending on the intended use of the UAV. The high degree of portability of the UAV due to its smaller stowed package allows it to be deployed rapidly for uses such as aerial reconnaissance, weather observation, data relay and surveying. These are examples of tasks often performed with UAVs and are not intended to limit the invention.

Stowable UAV Configuration

Figure 1A:
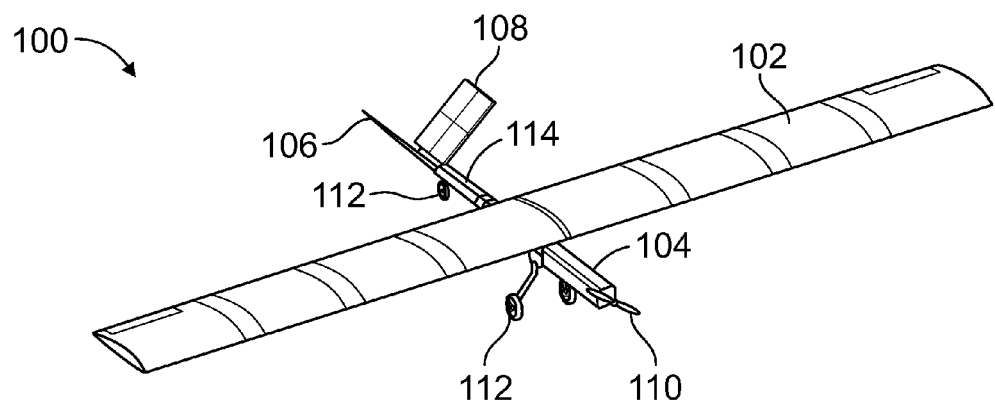
FIG. 1A illustrates a stowable unmanned aerial vehicle according to the present invention.

A UAV 100 according to a first embodiment is shown in FIG. 1A. This view shows UAV 100 in a fully deployed configuration including telescoping wing assembly 102, fuselage 104, empennage tail fins 106 and 108, propeller 110, landing equipment 112 and tail boom 114. In a preferred embodiment, the wing span of UAV 100 is approximately 14' and the fuselage 104 and tail boom 114 have a combined length of approximately 52" inches when fully deployed, though this description is not intended to limit its applicability to this size. Wing assembly 102 and tail boom 114 use a telescoping spar structure with four and two segments, respectively, but any number of segments could be used depending on material and intended use of the UAV.

Figure 1B:
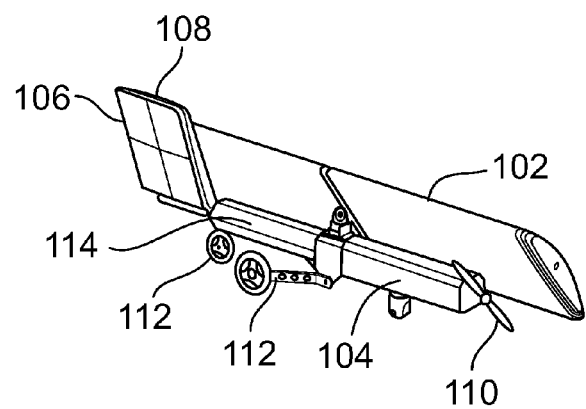
FIG. 1B illustrates the UAV of FIG. 1A in a fully stowed configuration.
Figure 1C:
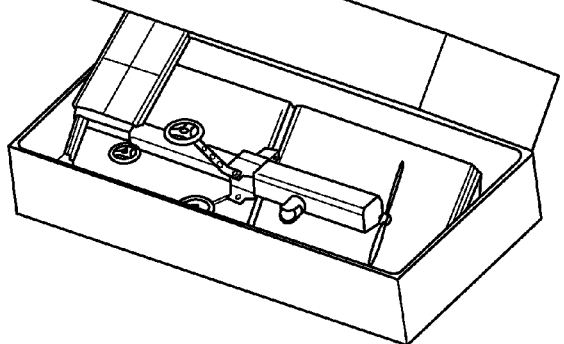
FIG. 1C illustrates the UAV of FIG. 1B stowed in a case for transportation.

FIG. 1B depicts UAV 100 in a fully stowed configuration. Empennage tail fins 106 and 108 have been rotated to one side of tail boom 114, which has been refracted. Wing assembly 102 has been retracted, rotated relative to the fuselage and tilted to one side. Landing gear 112 has been folded up towards the fuselage. FIG. 1C depicts UAV 100 packed into a case for easy transportation. In a preferred embodiment, UAV 100 may be packed in a case with interior dimensions of approximately 51"×21"×12"; this size is applicable to the 14 foot wingspan, other case dimensions would be needed for UAVs with different wingspans.

Figure 2:
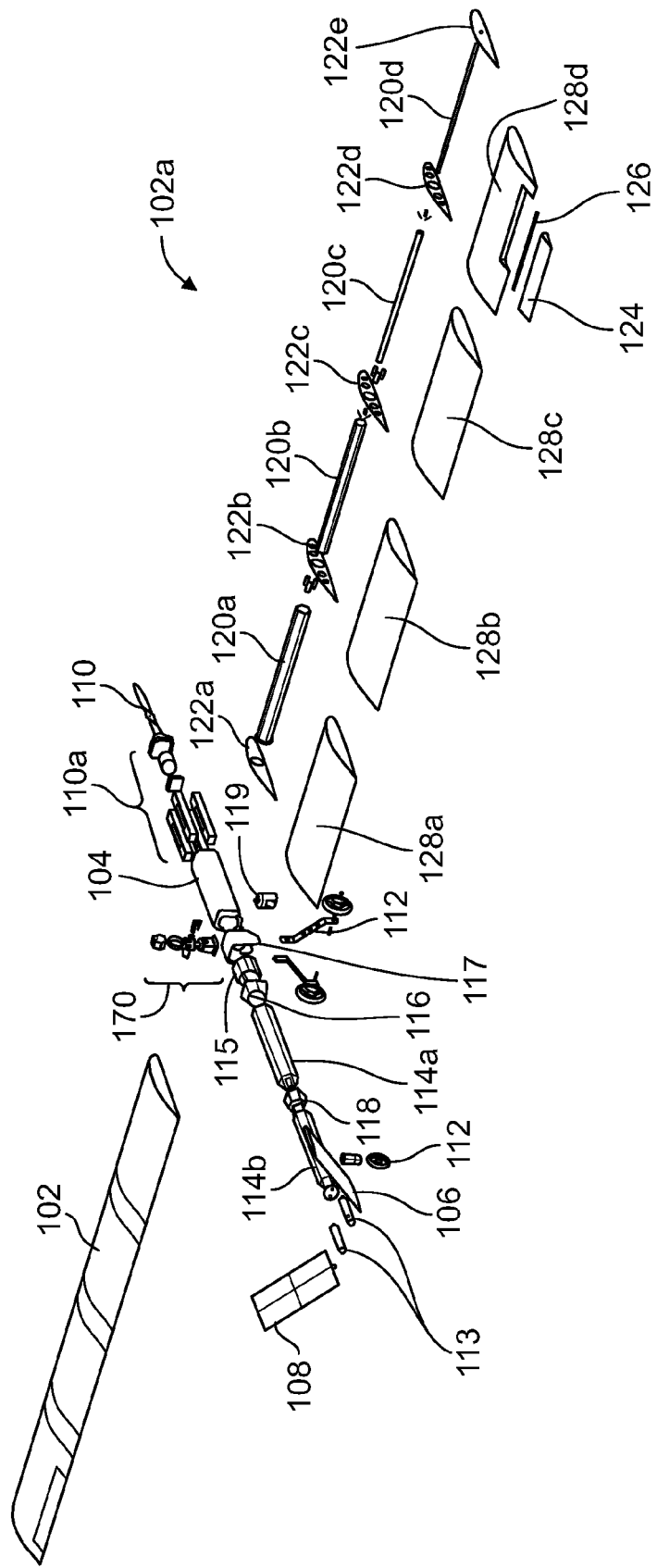
FIG. 2 illustrates an exploded view of the UAV of FIG. 1A.

An exploded view of UAV 100 is shown in FIG. 2. Wing assemblies 102 and 102a with telescoping masts extend from wing root pivot fitting 170, shown in more detail in FIGS. 8A-8C. Propeller 110 is connected to the motor assembly 110a within the fuselage as would be understood by one of ordinary skill in the art. Fuselage 104 is coupled to fuselage transition fitting 117. Telescoping tail segments 114a, 114b are attached to the opposite side of fuselage transition fitting 117 by bolted connections to tail boom connection fitting 115. Tail servo motors 113 control the motion of empennage tail fins 106 and 108. Elements 116 and 118 are aerodynamic fairings attached between tail segments 114a and 114b. Element 119 represents a camera/video component typical of UAV systems, although any suitable imaging or sensor device could be used.

An exploded view of a wing is shown at 102a. Telescoping spars 120a, 120b, 120c and 120d support ribs 122a, 122b, 122c, 122d and 122e. Wing skin segments 128a, 128b, 128c and 128d are attached to the ribs and slide over the telescoping spars as the wing is deployed and retracted. Aileron 124 is attached to hinge pin 126 in a notch in outboard wing skin segment 128d. Aileron 124 allows UAV 100 to be controlled during flight as would be understood by one of ordinary skill in the art. Both wing assemblies include an aileron 124, which are actuated by integral servo motors (not shown) located within the wing body near the hinge pins of the ailerons. Wires run along the inside length of the wing out to the servos from the UAV fuselage. Further details about wing assemblies are given in connection with FIGS. 4A-4C.

A method of deploying UAV 100 is shown in FIGS. 3A-3D. Beginning from the fully stowed configuration shown in FIG. 1B, FIG. 3A depicts UAV 100 in a first step where tail boom 114 has been deployed by withdrawing tail segment 114b from tail segment 114a. In FIG. 3B, tail fins 106 and 108 have been rotated into position and located on each side of tail boom 114 and landing gear 112 has been lowered away from fuselage 104. In FIG. 3C, wing assembly 102 has been tilted and rotated to a fully horizontal position perpendicular to fuselage 104. Finally, FIG. 3D depicts wing assembly 102 fully extended and UAV 100 ready for launch. In an embodiment, each wing 102 includes, for example, one or more solar cells 130. Solar cells could also be mounted at additional locations on wing 102, or on other surfaces of UAV 100. All extensions are performed by hand.

Wing Structure

Figures 4A, 4B, 4C:
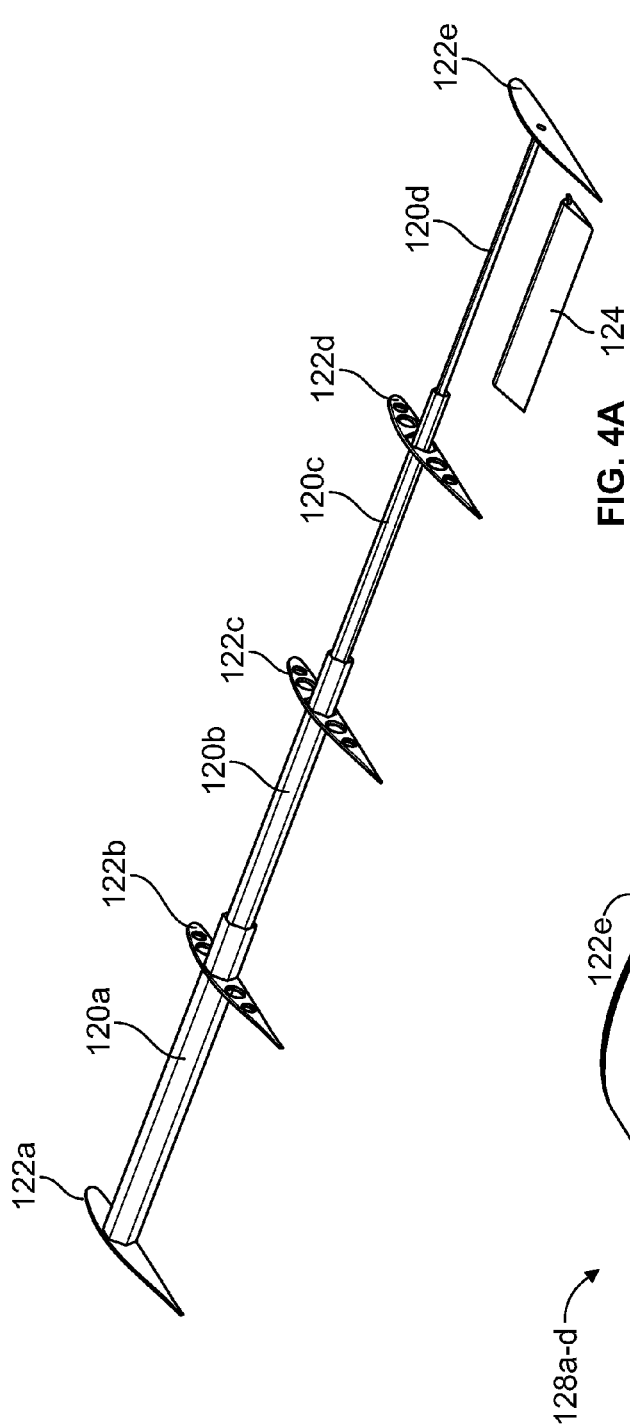
FIGS. 4A-4C illustrate the base structure of a wing of the UAV of FIG. 1A.

Wing assembly 102 includes two wings and will be described in connection with FIGS. 4-7. The base structure of a single wing of UAV 100 features a number of concentric tubes, as shown in FIG. 4A. Four tubes are shown but any number could be used depending on the performance requirements for UAV 100. Inboard tube 120a of FIG. 4A has a hexagonal cross section but any suitable shape could be used. Adjoining tube 120b has the same cross section but a slightly smaller diameter than base tube 120a so that tube 120b may be nested inside tube 120a when the wing is in a retracted position. Each successive tube has a smaller diameter for further nesting, providing a compact configuration when wing assembly 102 is retracted and UAV 100 is stowed. In a preferred embodiment, concentric tubes 120a-120d are made from a composite material (for example, fiberglass or a thermoplastic or thermoset based plastic blend) but any suitable material may be used in order to achieve a given length, envelope and structural characteristic. A series of ribs 122a-122e provide support for wing skin segments, shown in more detail in FIG. 4B. Inboard rib 122a is fixedly attached to the inboard end of inboard tube 120a. Outboard rib 122e is fixedly attached to the outboard end of outboard tube 120d.

Ribs 122b, 122c and 122d slid over tubes 120a, 12b and 120c respectively while fixedly attached to wing skin segments 128b, 128c and 128d respectively. When fully extended in a preferred embodiment, each tube and wing skin segment overlaps by approximately 4 inches to provide structural support. In a preferred embodiment, the skin is a thin, hard shell that is deployed, retracted and stowed with the tube and rib structure.

FIG. 4B depicts an end view of a fully retracted wing. Rib 122a is fixedly attached to inboard tube 120a and to skin segment 128a at its inboard end. Rib 122b is fixedly attached to the inboard end of wing skin segment 128b (also shown in FIG. 2.) Rib 122b slides over tube 120a to rest near rib 122a when the wing is in a retracted position, as shown in FIG. 4C. Rib 122c is fixedly attached to the inboard end of wing skin segment 128c and slides over tube 120b to rest near rib 122b when the wing is in a retracted position. Outboard skin segment 128d is fixedly attached to rib 122d at its inboard end and to rib 122e at its outboard end. Rib 122d slides over tube 120c during deployment and retraction of the wing.

FIG. 4C depicts a fully retracted wing. Inboard tube 120a is visible with tubes 120b, 120c and 120d telescoped inside. Ribs 122b-122d rest near inboard rib 122a while outboard 122e remains at the opposite end of retracted the retracted wing. Each rib is sized to fit its' associated wing skin and the inner spar tube.

Figure 5A:
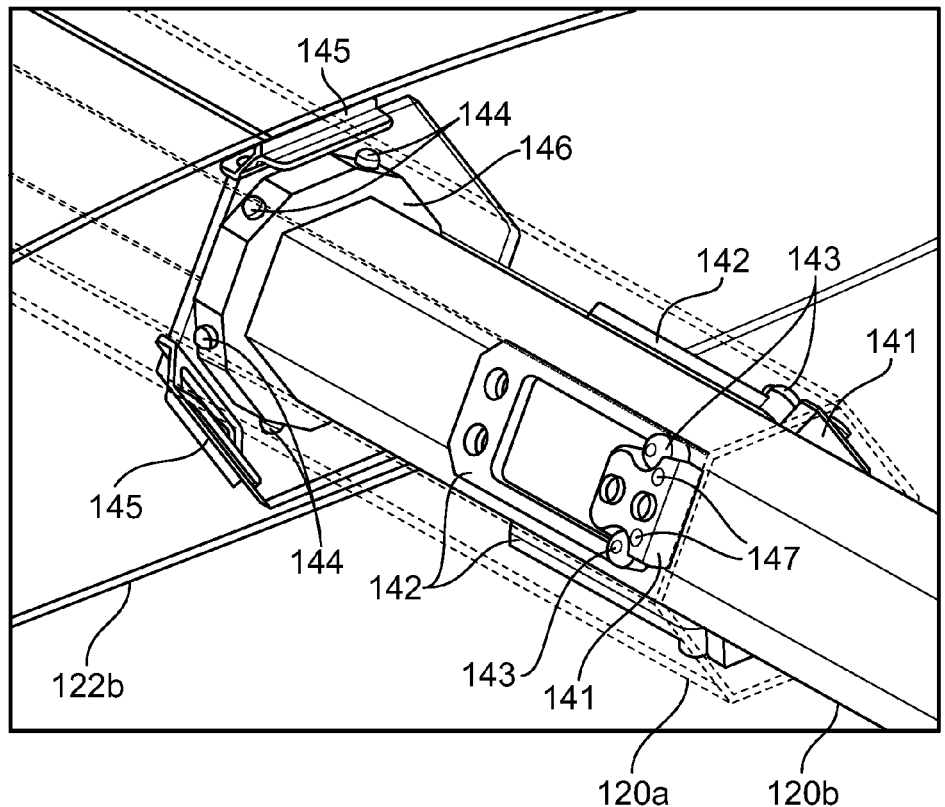
FIG. 5A illustrates the joint between each concentric tube of FIG. 4A.

FIG. 5A depicts the joint between each concentric tube of FIG. 4A. Tubes 120a and 120b are shown in FIG. 5A but an equivalent latching mechanism is used between each set of tubes. At least three latch receptacles 141 are evenly positioned around the inside circumference of tube 120a. Latch pawls 142 are attached to tube 120b and engage with latch receptacles 141 as wing assembly is deployed as shown in further detail in FIG. 5B. Elements 144 are pins positioned at each corner of the hexagonal tube root flange 146 of tube 120b to provide guidance during deployment and to react aerodynamic moment loads during flight. Guide pins 147 on each latch receptacle 141 react the bending moment couple. Elements 145 are spring tabs fixedly attached to tube 120a. They are used to hold rib 122b in position. These expand during deployment and retract (by compression) during stowage.

Figure 5B:
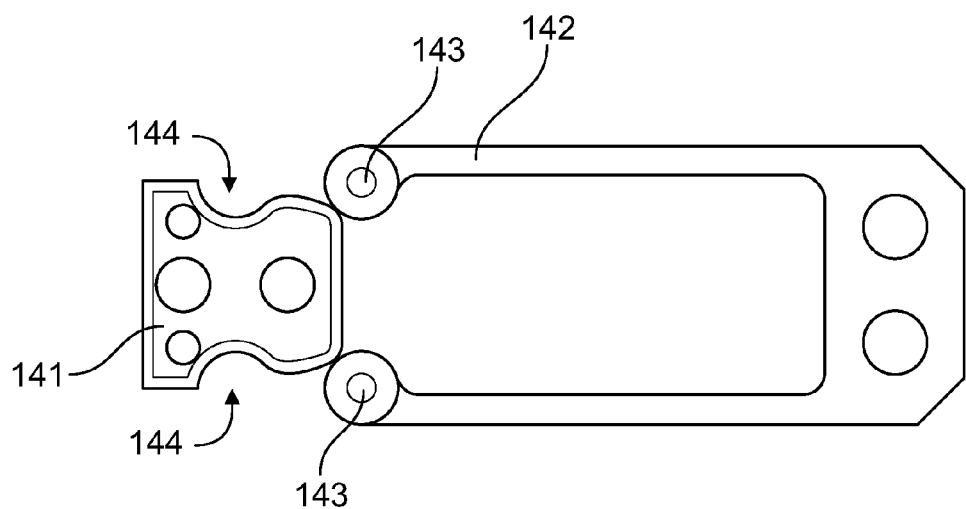
FIG. 5B illustrates a more detailed view of the latch of FIG. 5A.

FIG. 5B depicts a more detailed view of latch receptacle 141 and latch pawl 142 of FIG. 5A. Pins 143 on latch pawl 142 engage with cutout pockets 144 on latch receptacles 141 when UAV 100 is deployed. The pins 143 on latch pawls 142 ride up over the latch receptacles 141 during wing extension and seat in cutout pockets 144. The latch detent force is sized to be overcome by hand force during wing extension and retraction.

Figure 6:
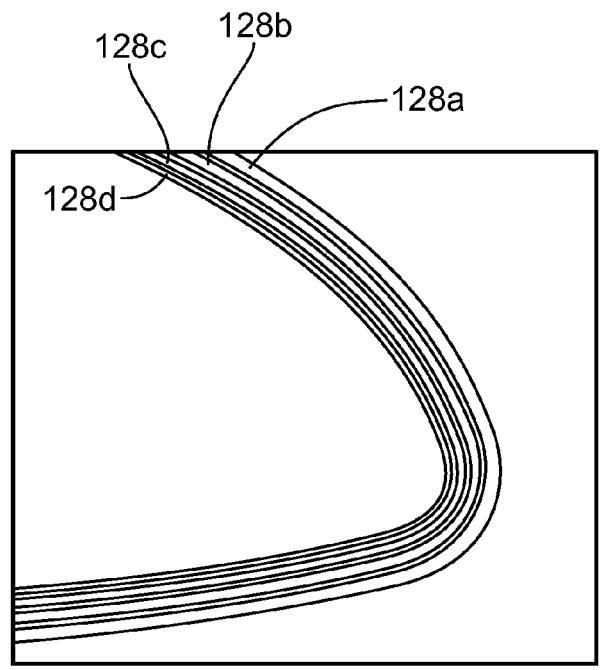
FIG. 6 illustrates concentric wing skins of FIG. 4B.

FIG. 6 illustrates a cross-section of the wing skins showing closely nested, concentric sets that clear each other for sliding deployment and stowage. Inboard skin 128a is the largest and contains all the other skins. Inside inboard skin 128a is second skin 128b, third skin 128c followed by outboard skin 128d. A preferred embodiment of 4 segments with their associated skins has been shown but any number of segments and skins could be used.

Figure 7:
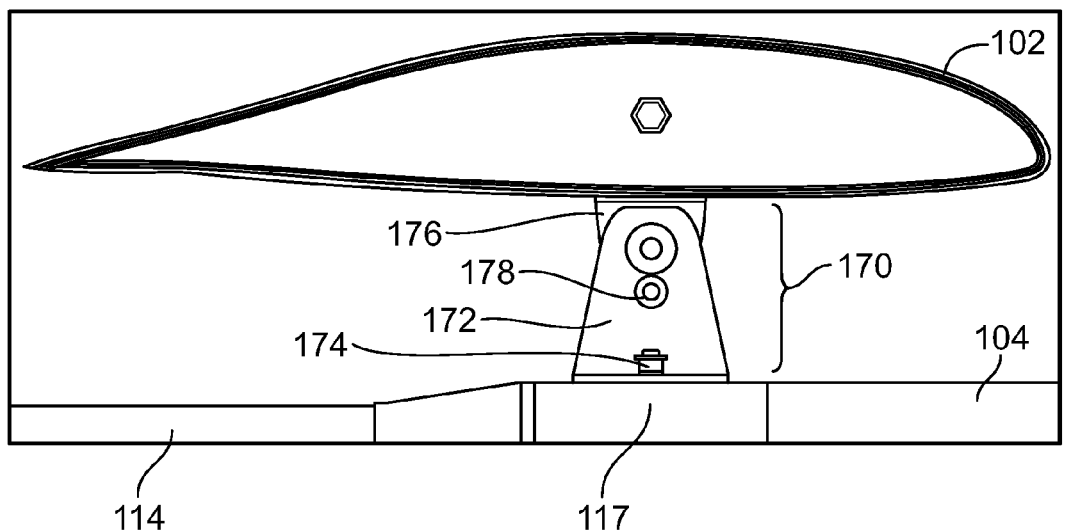
FIG. 7 illustrates a side view of the wing assembly of FIG. 1A.

FIG. 7 depicts a side view of wing assembly 102 of FIG. 1A. Wing assembly 102 is attached to fuselage 104 and tail boom 114 by wing root pivot fitting 170, shown in more detail in FIGS. 8A-8C. Root pivot fitting 170 includes a clevis fitting 172 and a rotation fitting 176. Position locking pins 174 and 178 are respectively associated with each fitting.

Figure 8A:
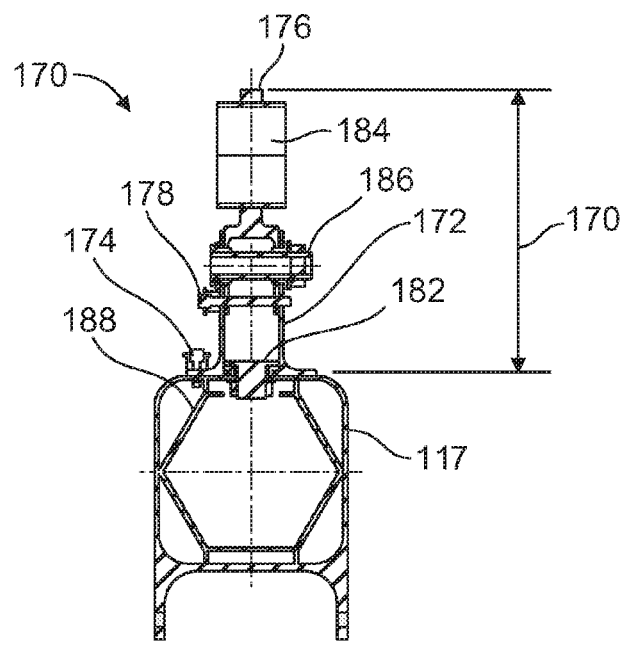
FIGS. 8A-8C illustrate further detail of the wing root pivot fitting of FIG. 8.
Figure 8B:
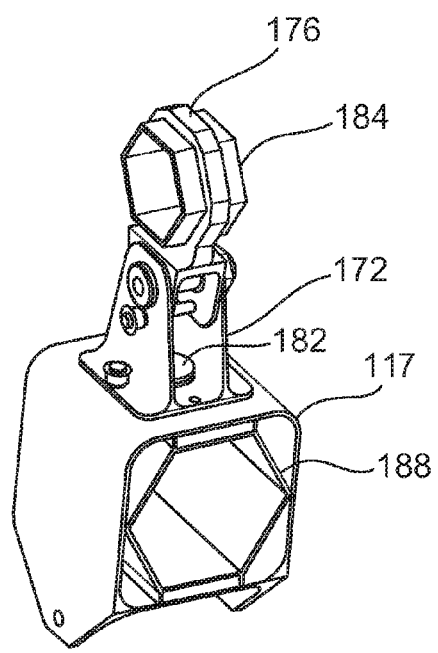
Figure 8C:
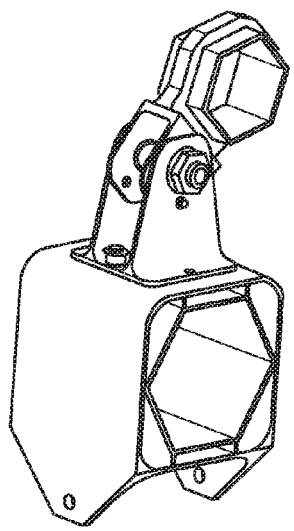

FIG. 8A depicts a front view of root pivot fitting 170 and fuselage transition fitting 117. FIG. 8B depicts an isometric view of the fittings of FIG. 8A. Clevis fitting 172 is attached to fuselage transition fitting 117, thus providing a vertical rotation pivot for wing assembly 102 around vertical rotation pin 182. Position lock pin 174 maintains clevis fitting 172 and thus wing assembly 102 in a desired position of rotation relative to fuselage 104. Rotation fitting 176 and connection fitting 184 are coupled to clevis fitting 172 by means of horizontal rotation pin 186. Position lock pin 178 maintains wing assembly at desired tilted position relative to fuselage 104. FIGS. 8A and 8B depict root pivot fitting 170 when wing assembly 102 is in a horizontal, deployed position for flight. FIG. 8C depicts fitting 170 when wing assembly 102 is tilted into a stowed position as also shown in FIG. 1B.

Fitting 188 of FIG. 8A provides a connection to tail boom 114. Hexagonal tail boom segment 114a slides inside fitting 188 and attaches with a set of screws. Only the inboard most section of tail boom attaches with screws.

Empennage

Figure 9A:
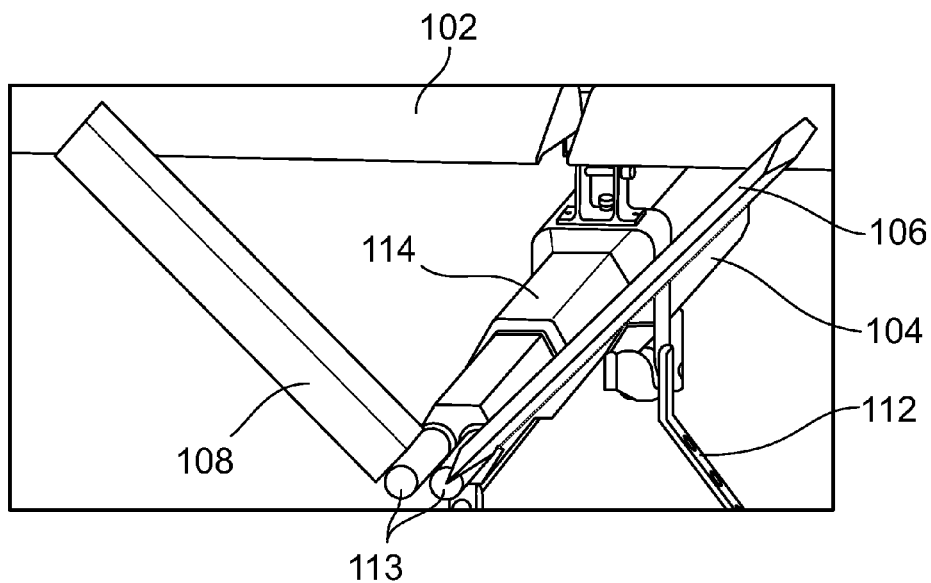
FIGS. 9A-9B illustrate a more detailed view of the empennage of the UAV of FIG. 1A.
Figure 9B:
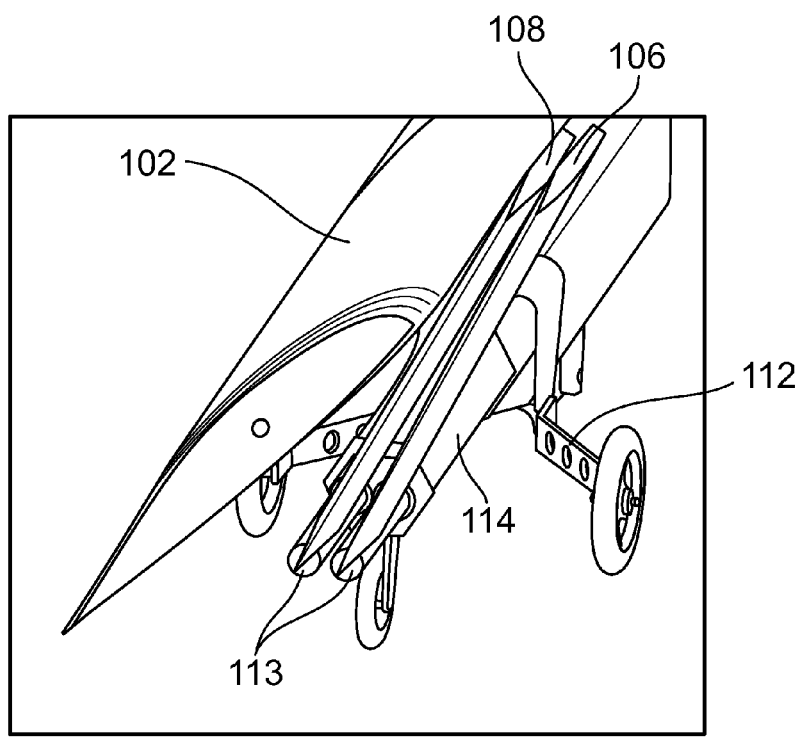

A more detailed view of empennage tail fins 106 and 108 are shown in FIGS. 9A-9B. A deployed configuration is shown in FIG. 9A. Servo motors 113 for controlling empennage tail fins 106 and 108 are mounted to the end of tail boom 114 opposite fuselage transition fitting 117. FIG. 9B depicts the empennage structure in a stowed configuration. Empennage tail fins 106 and 108 have been rotated to one side of tail 114, wing assembly 102 has been retracted, rotated and tilted to the other side of tail boom 114 and landing gear 112 has been folded up towards tail boom 114.

Propulsion

Propulsion can be provided by either an electric motor with battery or an internal combustion engine with fuel tank dependent on vehicle range and performance requirements. In an alternate embodiment, the wing skins and other surfaces could be covered with solar cells as shown, for example, at 130 in FIG. 3D for long-duration electric propulsion.

Guidance & Sensors Packaging

Vehicle avionics and electrical system components consist of communications transmitter/receiver, guidance positioning system, onboard computer, electric generator and voltage regulator, video camera, laser pointer, infrared camera, and sensors for various mission requirements.

Numerous alternative implementations of the present invention exist.

The above description of UAV 100 uses a representative wing span of approximately 14' and the fuselage 104 and tail 114 have a combined length of approximately 52" inches, however, other sizes are possible. In other embodiments, UAV 100 features wingspans, for example, of approximately 7', 8', 11', 23' and 27'. Different wingspans could require a different number of tube segments as well as changes in other dimensions of UAV 100, including, for example, battery power. These aspects of UAV 100 could be adjusted for each wingspan as would be understood by one of ordinary skill in the art.

Figure 10A:
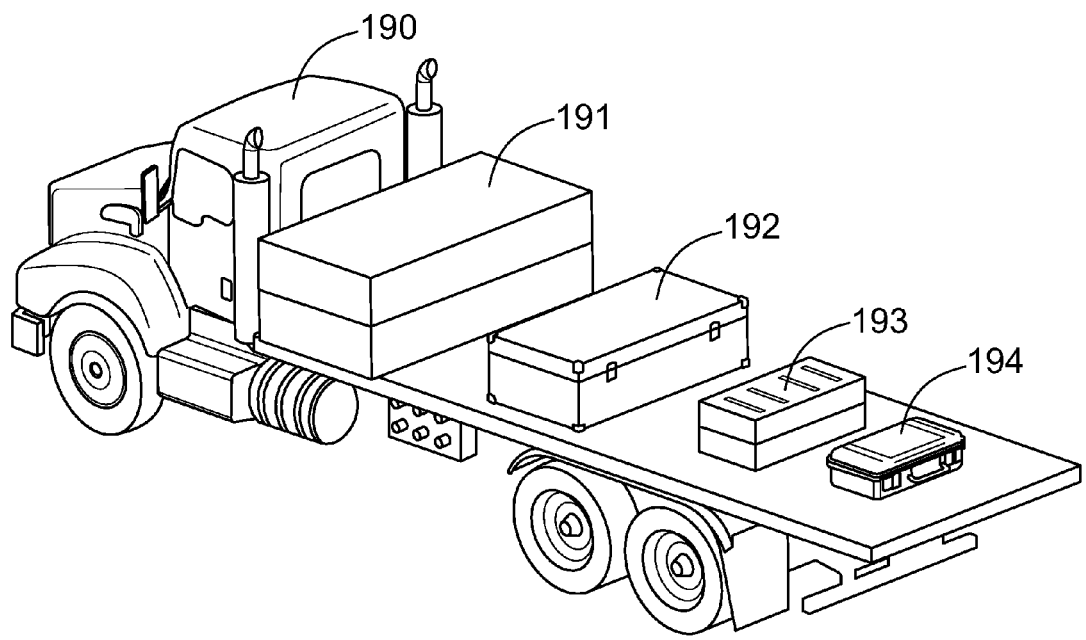
FIGS. 10A-10B illustrate packaging sizes for different wingspans of UAV's using this deployment system described herein.
Figure 10B:
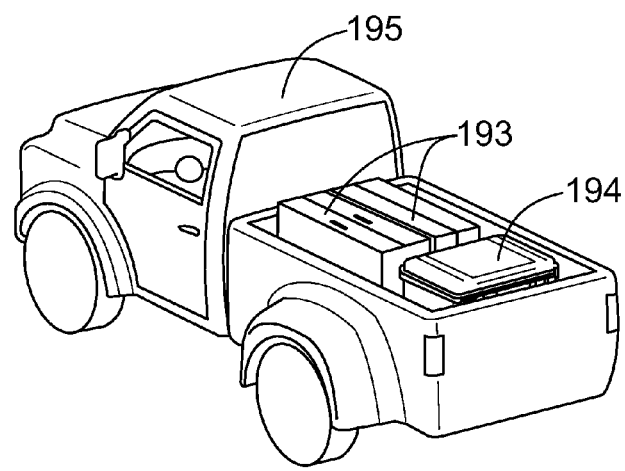

FIGS. 10A-10B depict sizes of stowed UAVs for various wingspans. While specific dimensions are listed, it should be understood that these are merely representative examples and a wide variety of dimensions could be used as necessitated by the required operation of the UAV. Transportation of the stowed UAV is accomplished within a hand-carry-able case or a backpack. FIG. 1C depicts a UAV stowed within a hand-carry-able case and FIGS. 10A-10B depict case size placements on different trucks (dependent on the UAV wingspan size).

Semi-tractor trailer 190 of FIG. 10A is shown with a case 191 for a UAV with a wingspan of approximately 26.9'. Case 191 in a preferred embodiment has dimensions of 100"× 48"× 35". Case 192 is representative of the size required for a UAV with a wingspan of approximately 22.8', and features dimensions of 80"×40"×22". Case 193 had dimensions of approximately 53.5"×38"×26" and is representative of the size required for a UAV with a wingspan of 14.8' while case 194 has dimensions of 40"×21"×12" for transporting a UAV with a wingspan of 8'. Cases 193 and 194 are small enough that they may also be transported in a pick-up truck, as shown in FIG. 10B. Two cases 193 are located side by side in the back of pick-up truck 195, while two cases 194 may be stacked.

Figure 11A:
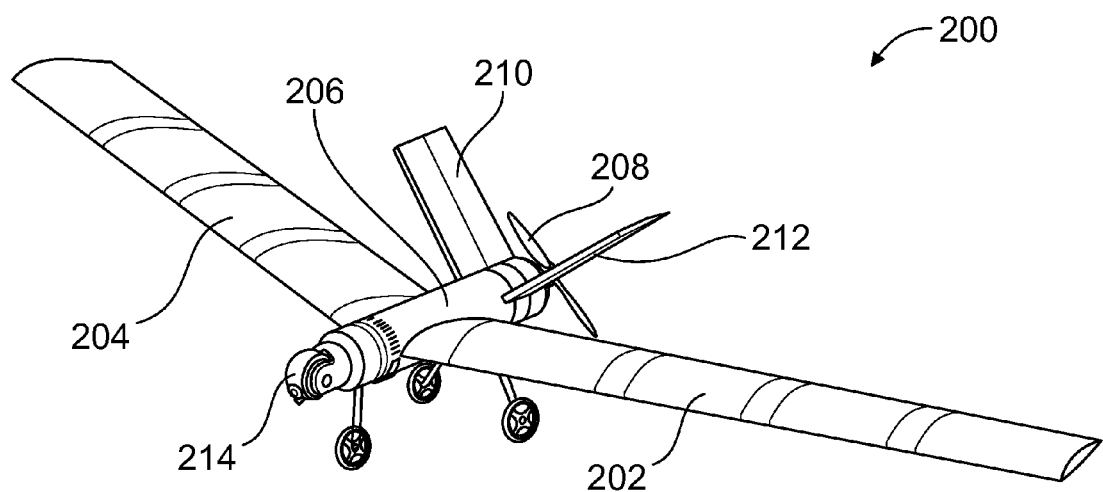
FIGS. 11A-11B illustrate an alternate 14 foot wingspan UAV configuration and its stowed packaging envelope using a similar wing deployment system with sliding spar tubes.
Figure 11B:
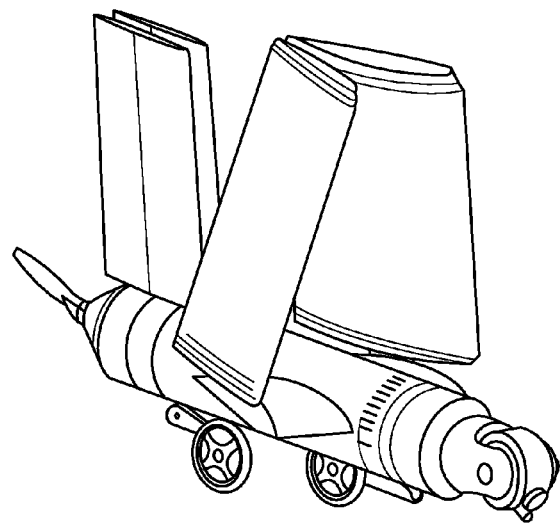

In the embodiments described above, wing assembly 102 is perpendicular to fuselage 104 when deployed. In other embodiments, as shown in FIGS. 11A-11B, wings 202, 204 are mounted at an angle to fuselage 206. They can be retracted and deployed using the telescoping spar structure described for UAV 100. FIG. 11A depicts an embodiment of UAV 200 fully deployed. Propulsion is provided by rear mounted propeller 208. Tail fins 210 and 212 are mounted to fuselage 206 as are wings 202 and 204. Sensor unit 214 includes, for example, a video camera, laser pointer, and infrared camera, although any preferred sensors could be used. A stowable configuration is shown in FIG. 11B. When the telescoping spar wings 202 and 204 are retracted and folded, together with the tail fins 210 and 212, UAV 200 can be packed in a case similarly to UAV 100 as shown in FIG. 1C.

If used and unless otherwise stated, the terms "upper," "lower," "front," "back," "over," "under," and similar such terms are not to be construed as limiting the invention to a particular orientation. Instead, these terms are used only on a relative basis.

An illustrative description of operation of the apparatus 100 is presented, for explanatory purposes.

The apparatus 100 in one example comprises a plurality of components such as one or more of electronic components, hardware components, and computer software components. A number of such components can be combined or divided in the apparatus 100. The apparatus 100 in one example comprises any (e.g., horizontal, oblique, or vertical) orientation, with the description and figures herein illustrating one example orientation of the apparatus 100, for explanatory purposes.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An unmanned aerial vehicle (UAV), comprising
   a fuselage;
   a telescoping wing assembly comprising a telescoping axis, said wing assembly comprising two wings, each further comprising:
   a plurality of concentric tubular mast segments coaxial with said telescoping axis, said mast segments configured to slide relative to adjacent mast segments;
   a plurality of ribs; and
   a plurality of skin segments each attached to at least one rib, said skin segments configured to slide relative to adjacent skin segments and said ribs configured to slide over at least on mast segment; and
   a wing root mechanism comprising:
   a vertical rotation pivot operatively coupling said wing assembly to said fuselage by a vertical rotation pin; and
   a horizontal rotation pivot operatively coupled to the telescoping wing assembly between the two wings and operatively coupled to the vertical rotation pivot by a horizontal rotation pin oriented perpendicularly to said vertical rotation pin, said vertical rotation pivot allowing said wing assembly to rotate around said vertical rotation pin between a stowed position in which the telescoping axis is parallel to an axis of the fuselage and a deployed position in which the telescoping axis is perpendicular to the axis of the fuselage, said horizontal rotation pivot allowing the wing assembly to tilt as a unit around said horizontal rotation pin into the stowed position.

2. The UAV of claim 1, wherein the fuselage further comprises:
   a front portion on one side of the wing root mechanism; and
   a tail portion on the opposite side of the wing root mechanism, said tail portion comprising a plurality of telescoping concentric tubular mast segments.

3. The UAV of claim 2, further comprising an empennage assembly rotatably attached to an end of the tail portion opposite the wing root mechanism.

4. The UAV of claim 1, wherein the wingspan of the wing assembly when fully extended is approximately 14 feet and further wherein the wing assembly when fully retracted has a wingspan such that the UAV may be stowed in a case with dimensions of approximately 51"×21"×12".

5. The UAV of claim 1, wherein the wingspan of the wing assembly when fully extended is approximately 8 feet and further wherein the wing assembly when fully retracted has a wingspan such that the UAV may be stowed in a case with dimensions of approximately 40"×21"×12".

6. The UAV of claim 1, wherein the wingspan of the wing assembly when fully extended is approximately 14.8 feet and further wherein the wing assembly when fully retracted has a wingspan such that the UAV may be stowed in a case with dimensions of approximately 53.5"×38"×26".

7. The UAV of claim 1, wherein the wingspan of the wing assembly when fully extended is approximately 22 feet and further wherein the wing assembly when fully retracted has a wingspan such that the UAV may be stowed in a case with dimensions of approximately 80"×40"×22".

8. The UAV of claim 1, wherein the wingspan of the wing assembly when fully extended is approximately 27 feet and further wherein the wing assembly when fully retracted has a wingspan such that the UAV may be stowed in a case with dimensions of approximately 100"×48"×35".

9. The UAV of claim 1 further comprising one or more imaging sensor devices.

10. A fixed-wing unmanned aerial vehicle (UAV), comprising:
    a fuselage;
    a telescoping wing assembly having a telescoping axis, said wing assembly comprising two wings each further comprising:
    a plurality of concentric tubular mast segments coaxial with said telescoping axis, said mast segments configured to slide relative to adjacent mast segments;
    a plurality of ribs; and
    a plurality of skin segments each attached to at least one rib, said skin segments configured to slide relative to adjacent skin segments and said ribs configured to slide over at least on mast segment;
    a wing root fitting further comprising:
    a vertical rotation pivot operatively coupled to the fuselage by a vertical rotation pin; and
    a horizontal rotation pivot operatively coupled to the telescoping wing assembly between the two wings and operatively coupled to the vertical rotation pivot by a horizontal rotation pin oriented perpendicularly to said vertical rotation pin, said vertical rotation pivot allowing the wing assembly to rotate around said vertical rotation pin between a position in which the telescoping axis is parallel to an axis of the fuselage and a position in which the telescoping axis is perpendicular to the axis of the fuselage and said horizontal rotation pivot allowing the wing assembly to tilt around said horizontal rotation pin.

11. The UAV of claim 10, wherein the fuselage further comprises:
    a front portion on one side of the wing root fitting; and
    a tail portion on the opposite side of the wing root fitting, said tail portion further comprising a plurality of concentric tubular mast segments.

12. The UAV of claim 11, further comprising an empennage assembly rotatably attached to an end of the tail portion opposite the wing root fitting.

13. The UAV of claim 11, wherein the wingspan of the wing assembly when fully extended is approximately 14 feet and further wherein the wing assembly when fully retracted has a wingspan such that the UAV may be stowed in a case with dimensions of approximately 51"×21"×12".

14. The UAV of claim 11, wherein the wingspan of the wing assembly when fully extended is approximately 8 feet and further wherein the wing assembly when fully retracted has a wingspan such that the UAV may be stowed in a case with dimensions of approximately 40"×21"×12".

15. The UAV of claim 11, wherein the wingspan of the wing assembly when fully extended is approximately 14.8 feet and further wherein the wing assembly when fully retracted has a wingspan such that the UAV may be stowed in a case with dimensions of approximately 53.5"×38"×26".

16. The UAV of claim 11, wherein the wingspan of the wing assembly when fully extended is approximately 22 feet and further wherein the wing assembly when fully retracted has a wingspan such that the UAV may be stowed in a case with dimensions of approximately 80"×40"×22".

17. The UAV of claim 11, wherein the wingspan of the wing assembly when fully extended is approximately 27 feet and further wherein the wing assembly when fully retracted has a wingspan such that the UAV may be stowed in a case with dimensions of approximately 100"×48"×35".

18. The UAV of claim 10, wherein said mast segments further comprise latch fittings for controlling a sliding motion of the mast segments as the telescoping wing assembly is retracted or deployed.

19. The UAV of claim 18, wherein each latch fitting further comprises:
   a latch receptacle mounted to the inside of one end of a mast segment, said latch receptacle further comprising cutout pockets on either side of the latch receptacle; and
   a latch pawl mounted to the outside of one end of an adjoining mast segment, said latch pawl further comprising pins which engage with the cutout pockets of the latch receptacle.

20. The UAV of claim 10, further comprising a means of propulsion.

21. The UAV of claim 20 further comprising solar cells attached to a surface of the UAV to power the means of propulsion.

22. The UAV of claim 10 further comprising one or more imaging sensor devices.

* * * * *